United States Patent
Aoki et al.

(10) Patent No.: US 9,376,583 B2
(45) Date of Patent: Jun. 28, 2016

(54) INK COMPOSITION, RECORDING APPARATUS, AND RECORDING METHOD

(71) Applicant: Seiko Epson Corporation, Tokyo (JP)

(72) Inventors: Katsuko Aoki, Kiso (JP); Takayoshi Kagata, Shiojiri (JP); Masahiro Yatake, Shiojiri (JP); Shoki Kasahara, Mobara (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/661,377

(22) Filed: Mar. 18, 2015

(65) Prior Publication Data

US 2015/0267066 A1 Sep. 24, 2015

(30) Foreign Application Priority Data

Mar. 19, 2014 (JP) .................................. 2014-056094

(51) Int. Cl.
- *C09D 11/10* (2014.01)
- *C09D 11/322* (2014.01)
- *C09D 11/326* (2014.01)
- *C09D 11/106* (2014.01)

(52) U.S. Cl.
CPC ............ *C09D 11/322* (2013.01); *C09D 11/106* (2013.01); *C09D 11/326* (2013.01)

(58) Field of Classification Search
USPC ........................................ 524/500, 501, 502
See application file for complete search history.

(56) References Cited

U.S. PATENT DOCUMENTS

| | | | | |
|---|---|---|---|---|
| 5,912,280 A | * | 6/1999 | Anton | C08F 265/06 106/31.13 |
| 6,057,384 A | * | 5/2000 | Nguyen | C08F 220/18 523/160 |
| 6,271,285 B1 | * | 8/2001 | Miyabayashi | C09D 11/30 523/160 |
| 6,498,202 B1 | * | 12/2002 | Sun | C09D 11/30 347/100 |
| 6,858,301 B2 | * | 2/2005 | Ganapathiappan | C09D 11/30 428/407 |
| 2003/0143344 A1 | | 7/2003 | Yau et al. | |
| 2006/0069182 A1 | * | 3/2006 | Nakamura | C09D 11/322 523/160 |
| 2008/0064786 A1 | * | 3/2008 | Tanaka | C09D 11/30 523/201 |
| 2014/0362136 A1 | * | 12/2014 | Yatake | C09D 11/30 347/20 |

FOREIGN PATENT DOCUMENTS

JP 2008-260300 A 10/2008

* cited by examiner

*Primary Examiner* — Vu A Nguyen

(74) *Attorney, Agent, or Firm* — Harness, Dickey & Pierce, P.L.C.

(57) ABSTRACT

An ink composition, which is recorded on a heated recording medium, includes: a color material; water; a first polymer particle; and a second polymer particle, in which the first polymer particle has a core-shell structure including a first core polymer and a first shell polymer, the second polymer particle has a core-shell structure including a second core polymer and a second shell polymer, each of the first shell polymer and the second shell polymer has a glass transition temperature (Tg) of 40° C. or higher, and the glass transition temperature Tg of the first shell polymer is higher than that of the second shell polymer.

8 Claims, 1 Drawing Sheet

INK COMPOSITION, RECORDING APPARATUS, AND RECORDING METHOD

BACKGROUND

1. Technical Field

The present invention relates to an ink composition, a recording apparatus, and a recording method.

2. Related Art

Ink jet recording methods have been rapidly developed in many areas because high-definition images can be recorded by a comparatively simple device. Among these methods, various studies have been made about ejection stability and the like. For example, in JP-A-2008-260300, there is described an ink jet ink composition which is excellent in ejection stability, which has improved feathering resistance to plain paper, and which can obtain an image or print having high abrasion resistance even to a recording medium that is difficult to absorb an ink composition. Specifically, JP-A-2008-260300 discloses an ink jet ink composition containing at least a pigment, water, an aqueous solvent, and a polymer particle, in which the polymer particle has a core-shell structure composed of a core portion and a shell portion, and the shell portion contains a predetermined monomer.

However, in the ink composition which is formed into a film on a recording medium by heating, resin adheres in a recording head. In order to improve the ejection stability of the ink composition by preventing the adherence of the resin, improving the glass transition temperature (hereinafter, referred to as "Tg") of the shell portion constituting the polymer fine particle (polymer particle) is considered. However, when the Tg of the shell portion is improved, it is difficult for the softening of the resin to occur when forming a film on the recording medium by heating. For this reason, there is a problem in that the adhesiveness of the film to the recording medium becomes poor. Meanwhile, even when the Tg of the shell portion is lowered such that the adhesiveness is improved even by relatively low-temperature heating, the adherence of the polymer particle in the warmed recording head easily occurs, and thus there is a problem of ejection stability becoming poor.

SUMMARY

An advantage of some aspects of the invention is to provide an ink composition having excellent ejection stability and adhesiveness, a recording apparatus using the ink composition, and a recording method.

The present inventors have conducted intensive studies. As a result, they have found that the invention can be realized by using two kinds of polymer particles containing shell polymers having glass transition temperatures (Tg) different from each other, thus completing the invention.

According to an aspect of the invention, there is provided an ink composition, which is recorded on a heated recording medium, including: a color material; water; a first polymer particle; and a second polymer particle, in which the first polymer particle has a core-shell structure including a first core polymer and a first shell polymer, the second polymer particle has a core-shell structure including a second core polymer and a second shell polymer, each of the first shell polymer and the second shell polymer has a glass transition temperature of 40° C. or higher, and the glass transition temperature of the first shell polymer is higher than that of the second shell polymer.

In the ink composition, when the first shell polymer contains an aromatic monomer as constitutional unit and the second shell polymer contains an aromatic monomer as a constitutional unit, the content of the aromatic monomer as a constitutional unit in the second shell polymer is preferably lower than the content of the aromatic monomer as a constitutional unit in the first shell polymer.

Each of the first and second polymer particles is preferably synthesized without substantially using an emulsifier.

The first polymer particle preferably contains an aromatic monomer as a constitutional unit in an amount of 10 mass % to 70 mass %.

The glass transition temperature of the first core polymer is preferably higher than that of the second core polymer.

The content ratio of the first polymer particle and the second polymer particle is preferably 1:1 to 3:1.

Each of the first and second polymer particles preferably has an average particle diameter of 10 nm to 100 nm.

The ink composition preferably further includes a cyclic nitrogen compound and/or an aprotic polar solvent.

According to another aspect of the invention, there is provided a recording apparatus, including: the above-described ink composition; and an ejection head ejecting the ink composition.

In the recording apparatus, the ejection head preferably includes nozzles ejecting an ink composition, and dots of the ink composition are preferably ejected from one of the nozzles in a multi-size.

According to still another aspect of the invention, there is provided a recording method, including: ejecting the above-described ink composition onto a heated recording medium using an ejection head to adhere the composition to the recording medium.

BRIEF DESCRIPTION OF THE DRAWING

The invention will be described with reference to the accompanying drawing, wherein like numbers reference like elements.

FIGURE is a schematic view showing a schematic configuration of an ink jet recording apparatus according to the present embodiment.

DESCRIPTION OF EXEMPLARY EMBODIMENTS

Figure 1:
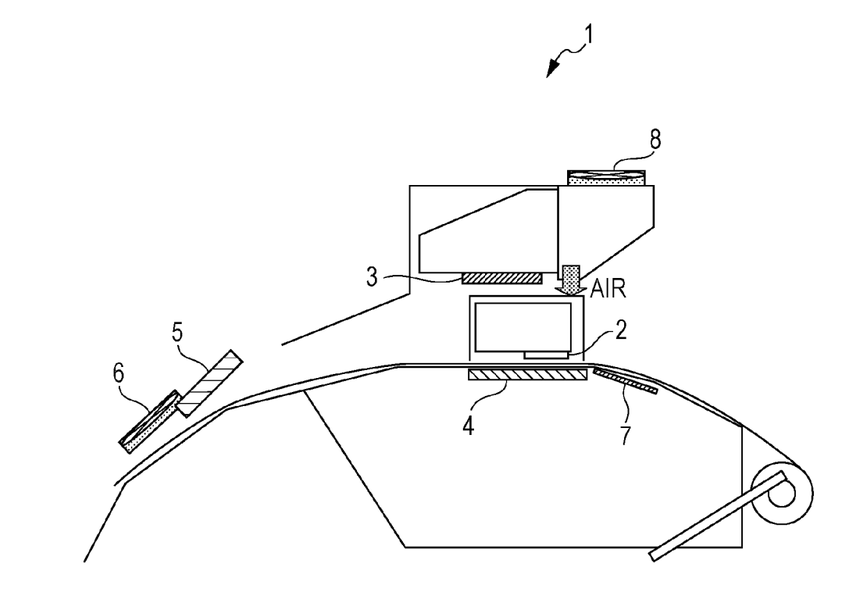

Hereinafter, preferred embodiments of the invention will be described in detail. However, the invention is not limited to the following embodiments. Various modifications can be made within the scope not departing from the gist thereof.

Ink Composition

The ink composition according to the present embodiment, which is recorded on a heated recording medium, includes: a color material; water; a first polymer particle; and a second polymer particle, in which the first polymer particle has a core-shell structure including a first core polymer and a first shell polymer, the second polymer particle has a core-shell structure including a second core polymer and a second shell polymer, each of the first shell polymer and the second shell polymer has a glass transition temperature (hereinafter, referred to as "Tg") of 40° C. or higher, and the Tg of the first shell polymer is higher than that of the second shell polymer.

Color Material

The color material is selected from pigments and dyes.

Pigment

In the present embodiment, when a pigment is used as the color material, it is possible to improve the light resistance of ink. As the pigment, any one of inorganic pigments and organic pigments may be used.

The inorganic pigment is not particularly limited, but examples thereof include carbon black, iron oxide, titanium oxide, and silica oxide. These inorganic pigments may be used alone or in a combination of two or more thereof.

The organic pigment is not particularly limited, but examples thereof include Quinacridone-based pigments, quinacridonequinone-based pigments, dioxazine-based pigments, phthalocyanine-based pigments, anthrapyrimidine-based pigments, anthanthrone-based pigments, indanthrone-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, and azo-based pigments. Specific examples of the organic pigment are exemplified as follows.

The pigment used in black ink is not particularly limited, but an example thereof includes carbon black. Carbon black is not particularly limited, but examples thereof include furnace black, lamp black, acetylene black, and channel black (C.I. Pigment Black 7). Further, the commercially available product of carbon black is not particularly limited, but examples thereof include No. 2300, No. 900, MCF88, No. 20B, No. 33, No. 40, No. 45, No. 52, MA7, MA8, MA100, and No. 2200B (all are trade names, manufactured by Mitsubishi Chemical Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, Special Black 250, or the like (all are trade names, manufactured by Degussa AG); Conductex SC, Raven 5750, Raven 5250, Raven 5000, Raven 3500, Raven 1255, Raven 700, or the like (all are trade names, manufactured by Columbian Carbon Japan, Ltd.); and Regal 400R, Regal 330R, Regal 660R, Mogul L, Monarch 700, Monarch 800, Monarch 880, Monarch 900, Monarch 1000, Monarch 1100, Monarch 1300, Monarch 1400, Elftex 12 or the like (all are trade names, manufactured by CABOT Corporation).

Examples of the pigment used in cyan ink include C.I. Pigment Blues 1, 2, 3, 15, 15:1, 15:2, 15:3, 15:4, 15:6, 15:34, 16, 18, 22, 60, 65, and 66; and C.I. Bat Blues 4 and 60. Among these, at least one of C.I. Pigment Blues 15:3 and 15:4 is preferable.

Examples of the pigment used in magenta ink include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:4, 57, 57:1, 88, 112, 114, 122, 123, 144, 146, 149, 150, 166, 168, 170, 171, 175, 176, 177, 178, 179, 184, 185, 187, 202, 209, 219, 224, 245, 254, and 264; and C.I. Pigment Violets 19, 23, 32, 33, 36, 38, 43, and 50. Among these, one or more selected from the group consisting of C.I. Pigment Red 122, C.I. Pigment Red 202, and C.I. Pigment Violet 19 is preferable.

Examples of the pigment used in yellow ink include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213. Among these, one or more selected from the group consisting of C.I. Pigment Yellows 74, 155, and 213 is preferable.

Examples of the pigment used in white ink include, but are not particularly limited to, C.I. Pigment Whites 6, 18, and 21, titanium oxide, zinc oxide, zinc sulfide, antimony oxide, zirconium oxide, white hollow resin particles, and polymer particles.

In addition, as the pigments used in color inks such as green ink, orange ink, except for the above colors, commonly known pigments are used.

Dye

In the present embodiment, a dye can be used as the color material. The dye is not particularly limited, but examples thereof include acidic dyes, direct dyes, reactive dyes, and basic dyes.

The content of the color material is preferably 0.4 mass % to 12 mass %, and more preferably 2 mass % to 7 mass %, based on the total mass (100 mass %) of ink.

Water

The ink composition according to the present embodiment includes water. Examples of water include pure water, such as ion exchange water, ultrafiltered water, reverse osmosis water, and distilled water; and ultrapure water which is obtained by completely removing ionic impurities as much as possible. In addition, when water sterilized by ultraviolet irradiation or addition of hydrogen peroxide is used, it is possible to prevent the occurrence of mold and bacteria in the case where a pigment dispersion liquid and an ink using the same are stored for a long period of time.

The content of water is not particularly limited, and may be appropriately determined as necessary.

First Polymer Particle

The ink composition according to the present embodiment includes a first polymer particle having a core-shell structure having a first core polymer and a first shell polymer. Here, the first shell polymer has a glass transition temperature of 40° C. or higher. The glass transition temperature of the first shell polymer is higher than that of the second shell polymer.

The core-shell structure refers to a structure in which a first core polymer is formed in the void of a first shell polymer. Therefore, the core-shell structure includes not only a structure in which the surface of the first core polymer is covered with the first shell polymer, but also a structure in which a part of the void of a three-dimensional network structure caused by the first shell polymer is filled with the first core polymer. Accordingly, the core-shell structure in the present specification includes a structure of a polymer particle in which the boundary between the core part and the shell part are not exactly clear.

First Core Polymer

It is preferable that the glass transition temperature of the first core polymer is higher than that of the second core polymer of the second polymer particle. In order to secure adhesiveness, the glass transition temperature of the first core polymer is set to be lower than that of the first shell polymer. Since the glass transition temperature of the first shell polymer is set to be higher than that of the second shell polymer, the glass transition temperature of the first core polymer also is set to be higher than that of the second core polymer, but it is possible to secure the difference in glass transition temperature between the core polymer and the shell polymer in each of the first polymer particle and the second polymer particles, and thus it is possible to ensure the stability and intended function of the polymer particles.

The glass transition temperature of the first core polymer is not particularly limited, but, for example, is preferably lower than 60° C., and more preferably 0° C. to lower than 60° C. The glass transition temperature of the first core polymer is lower than 60° C. In addition, the glass transition temperature of the core polymer is lower than that of the shell polymer. Since the first core polymer is easily discharged after the first shell polymer is softened, the adhesiveness of the ink composition is excellent. Further, since the glass transition temperature of the first core polymer is 0° C. or higher, the storage stability of the ink composition is excellent.

Glass transition temperature (hereinafter, referred to as "Tg") is calculated by using an analysis method such as viscoelasticity measurement, thermal analysis or the like, or by using a calculation formula based on Tg of homopolymer of commonly known polymerizable monomers. When the polymer included in the first core polymer and the following first shell polymer is a copolymer, the glass transition temperature (Tg) of the copolymer can be calculated by the following FOX Equation based on $Tg_n$ (unit: K) of various hompolymers and mass fraction ($W_n$) of monomer.

$$\frac{1}{Tg} = \frac{W_1}{Tg_1} + \frac{W_2}{Tg_2} + \ldots + \frac{W_n}{Tg_n}$$

Here, $W_n$: mass fraction of each monomer, $Tg_n$: Tg of homopolymer of each monomer (unit: K), and Tg: Tg of copolymer (unit: K).

In other words, when a polymer is a homopolymer, the glass transition temperature of the first core polymer or the first shell polymer can be controlled by selecting the homopolymer. In addition, when a polymer is a copolymer, the glass transition temperature thereof can be controlled by considering Tg of the above homopolymer and the above FOX Equation.

The first core polymer is designed to be a highly hydrophobic polymer. Therefore, it is preferable that the acid value of the first core polymer is lower than that of the first shell polymer. The acid value of the first core polymer is preferably 50 mgKOH/g or less, further preferably 25 mgKOH/g or less, more preferably 5 mgKOH/g or less, and most preferably the first core polymer does not have an acid value. In addition, it is preferable that the first core polymer includes at least an aromatic monomer as a constitutional unit. Therefore, the first core polymer becomes hydrophobic, and thus a hydrophobic film can be formed. As a result, it is possible to improve water friction resistance that is one of the friction resistances of a recorded image.

In addition, examples of the constitutional unit of the first core polymer include, but are not limited to, a hydrophilic (meth)acrylate monomer, a hydrophobic (meth)acrylate monomer having an alkyl group of 3 or more carbon atoms, a hydrophobic (meth)acrylate monomer having a cyclic structure, a (meth)acrylamide monomer or an N-substituted derivative thereof, and a carboxylic acid monomer.

Examples of the aromatic monomer include, but are not limited to, styrene, α-methyl styrene, p-methyl styrene, vinyl toluene, chlorostyrene, and divinyl benzene.

Examples of the hydrophilic (meth)acrylate monomer include, but are not limited to, methyl (meth)acrylate, ethyl (meth)acrylate, α-hydroxymethyl (meth)acrylate, 2-hydroxyethyl (meth)acrylate, (poly)ethyleneglycol (meth)acrylate, methoxy(poly)ethylene glycol (meth)acrylate, ethoxy(poly)ethyleneglycol (meth)acrylate, and (poly)propyleneglycol (meth)acrylate. Among these, methyl (meth)acrylate and ethyl (meth)acrylate are preferable. Here, the "hydrophilicity" means that the solubility in 100 mL of water (20° C.) is 0.3 g or more.

Examples of the hydrophobic (meth)acrylate monomer having an alkyl group of 3 or more carbon atoms include, but are not limited to, (meth)acrylates having an alkyl group of or more carbon atoms, such as n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth)acrylate, lauryl (meth)acrylate, stearyl (meth)acrylate, cetyl (meth)acrylate, neopentyl (meth)acrylate, behenyl (meth)acrylate, and the like. Among these, lauryl (meth)acrylate is preferable. Here, the "hydrophobicity" means that the solubility in 100 mL of water (20° C.) is less than 0.3 g.

Examples of the hydrophobic (meth)acrylate monomer having a cyclic structure include, but are not limited to, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, norbornyl (meth)acrylate, adamantyl (meth)acrylate, and tetrahydrofurfuryl (meth)acrylate.

Examples of the (meth)acrylamide monomer or the N-substituted derivative thereof include, but are not limited to, (meth)acrylamides or N-substituted derivatives thereof, such as (meth)acrylamide, N-hydroxymethyl (meth)acrylamide, diacetone acrylamide, N,N-dimethyl acryl(meth)amide, and the like.

Examples of the carboxylic acid monomer include, but are not limited to, (meth)acrylic acid, crotonic acid, maleic acid, fumaric acid, and itaconic acid. Among these, (meth)acrylic acid is preferable. Here, the "carboxylic acid monomer unit" refers to a polymerizable monomer unit having a carboxyl group and a polymerizable unsaturated group.

The above monomers may be used alone or in a combination of two or more thereof.

Among all the repeating units constituting the polymer contained in the first core polymer, the content of the repeating unit derived from the hydrophobic monomer is preferably 80 mass % or more, and more preferably 90 mass % or more. When the content of the repeating unit derived from the hydrophobic monomer is within the above range, a hydrophobic film is formed on the surface of an image recorded on a recording medium by performing heat treatment or the like, and thus the friction resistance of the image tends to be further improved.

First Shell Polymer

The glass transition temperature of the first shell polymer is 40° C. or higher, and preferably 40° C. to 150° C. When the glass transition temperature of the first shell polymer is 40° C. or higher, in the case where the ink composition is ejected in a high-temperature environment, it is possible to eject the polymer particles from a recording head without disrupting a core-shell type structure, and it is possible to further suppress the adherence of the polymer particles in nozzles, so that the clogging of nozzles can be prevented, and the stability of the ink composition in intermittent printing tends to become more excellent. In the case where a film is formed on the recording medium, the ink composition on the recording medium is heated to a temperature higher than the glass transition temperature of the first shell polymer, and thus the first core polymer flows out from the softened first shell polymer, thereby forming a film on the recording medium by the first core polymer and the first shell polymer. At this time, the softened first core polymer spreads and adheres onto the recording medium, thereby forming a film having excellent fixability. Further, when the glass transition temperature of the first shell polymer is 150° C. or lower, the first shell polymer on the recording medium is easily softened, and thus the adhesiveness of the ink composition tends to become excellent. Meanwhile, when the glass transition temperature of the first shell polymer is higher than 150° C., the thermal deformation properties of the emulsion type resin become poor, thus having a negative influence such as thickening or the like on the system.

In the present embodiment, the glass transition temperature of the first shell polymer is higher than that of the second shell polymer. When the first polymer particle including this first shell polymer is used, the adherence of polymer particles in the nozzles can be more suppressed, compared to when the second polymer particle is used, and thus the clogging of the nozzles can be prevented. On the other hand, when the second polymer particle including the second shell polymer having lower glass transition temperature than the first shell polymer is used, the adhesiveness to the recording medium can be improved, compared to when the first polymer is used. Therefore, when the first polymer particle and the second polymer particle are used in combination with each other, it is possible to achieve the balance between the adhesiveness to the recording medium and the ejection stability.

Since the first shell polymer is hydrophilic, it has an acid value. Preferably, the acid value of the first shell polymer is 20 mgKOH/g to 120 mgKOH/g. When the acid value thereof is within the above range, sufficient hydrophilicity necessary for the first shell polymer can be secured.

It is preferable that the first shell polymer contains an aromatic monomer as a constitutional unit. The content of an aromatic monomer as a constitutional unit in the first shell polymer is higher than the content of an aromatic monomer as a constitutional unit in the second shell polymer even when the second shell polymer contains an aromatic monomer as constitutional unit. When the first shell polymer contains an aromatic monomer as a constitutional unit, a detailed action mechanism is unknown, but the ejection bending is prevented. In particular, in the case of small dots, ink droplets easily bend, and thus ejection bending is suppressed according to an aspect of the invention. Therefore, the ink composition according to an aspect of the invention is suitable for a head that can eject ink dots in a multi-size from one nozzle. In addition, the first shell polymer contains a larger amount of relatively stiff aromatic monomer than the second shell polymer, thereby improving the water friction resistance (wet friction) of a coated film formed on the recording medium. Further, when the content of an aromatic monomer as a constitutional unit in the first shell polymer is higher than the content of an aromatic monomer as a constitutional unit in the second shell polymer, it is possible to improve the hydrophobicity of the first shell polymer having a high glass transition temperature, and it is possible to secure stability even in a state in which the concentration of an organic solvent becomes higher by the evaporation of moisture.

In addition, it is preferable that the first shell polymer contains a (meth)acrylate monomer and a carboxylic acid monomer as a constitutional unit. When such a polymer is used, it is possible to provide a carboxyl group on the surface of the first shell polymer. Therefore, the dispersion stability of the polymer particles is further improved, and the viscosity of the ink composition becomes relatively low, and thus ejection stability tends to be further improved. The (meth)acrylate monomer is not particularly limited, but examples thereof include a hydrophilic (meth)acrylate monomer, a hydrophobic (meth)acrylate monomer having an alkyl group of 3 or more carbon atoms, and a hydrophobic (meth)acrylate monomer having a cyclic structure. Specific examples of the (meth)acrylate monomer and the carboxylic acid monomer are the same as those of the above-mentioned monomers constituting the polymer contained in the core polymer. These monomers may be used alone or in a combination of two or more thereof.

In the first shell polymer, the ratio of the aromatic monomer to the carboxylic acid monomer (aromatic monomer/carboxylic acid monomer) is preferably 0.15 or more. Thus, it is possible to obtain an ink composition excellent in the balance of the improvement of friction resistance due to the aromatic monomer and the improvement of re-dispersibility due to the carboxylic acid monomer.

Among all the repeating units constituting the polymer contained in the first shell polymer, the content of the repeating units derived from the (meth)acrylic acid ester and the unsaturated carboxylic acid is preferably 30 mass % or more, more preferably 40 mass % or more, and still more preferably 45 mass % or more.

Among all the repeating units constituting the polymer contained in the first shell polymer, the content of the repeating unit derived from the hydrophilic monomer is preferably 30 mass % or more, more preferably 40 mass % or more, and still more preferably 45 mass % or more. When the content of the repeating unit derived from the hydrophilic monomer is within the above range, since the hydrophilicity of the first shell polymer is improved, the dispersion stability of the first polymer particles in the ink composition tends to be improved. In addition, since it is possible to effectively suppress the adherence of the first polymer particles to nozzles, the ejection stability of the ink composition from the nozzles of a recording head tends to be better.

Meanwhile, among all the repeating units constituting the resin contained in the shell polymer, the content of the repeating unit derived from the hydrophobic monomer is preferably 10 mass % or more, more preferably 20 mass % or more, and still more preferably 30 mass % or more. By setting the content of the repeating unit derived from the hydrophobic monomer to be within the above range, even when the occupancy rate of an organic solvent is increased due to the drying of water in the recording head and on the recording medium, the dispersion of the polymer particles is stable, and the aggregation of the polymer particles can be suppressed.

Entire First Polymer Particles

Preferably, the first polymer particle, including both the first core polymer and the first shell polymer, contains an aromatic monomer in an amount of 10 mass % to 70 mass % as a constitutional unit. When the first polymer particle contains a relatively stiff aromatic monomer in an amount of 10 mass % to 70 mass %, the water friction resistance (wet friction) of a coated film formed on the recording medium can be improved.

For example, the first polymer particles are prepared such that the acid value thereof is 50 mgKOH/g or more. When the acid value of the first polymer particles is mgKOH/g or more, the re-dispersibility of the first polymer particles in water can be improved, and thus an excellent clogging recovery property is exhibited, and long-term nozzle clogging prevention performance (clogging recovery property) is improved.

The average particle diameter of the first polymer particles is preferably 10 nm to 100 nm. As such, when the average particle diameter of the first polymer particles is relatively small, the gloss of the recorded image easily appears, and excellent film forming properties are exhibited. In addition, when the average particle diameter of the first polymer particles is relatively small, a large lump is hardly formed even when the first polymer particles are aggregated, and thus it is possible to suppress the clogging of nozzles. Further, when the average particle diameter of the first polymer particles is small, the viscosity of the ink composition can be increased relatively high, and thus it is possible to prevent the viscosity of the ink composition from being lowered to such a degree that ink ejection properties becomes unstable, even when the temperature of the ink composition rises in the recording head.

Moreover, in the present specification, the average particle diameter is based on volume unless otherwise specified. For example, the average particle diameter can be measured by a particle size distribution analyzer using a laser diffraction scattering method as a measurement principle. An example of the particle size distribution analyzer includes a particle size distribution meter (for example, Microtrac UPA, manufactured by Nikkiso Co., Ltd.) using a dynamic light scattering method as a measurement principle.

In the ratio of the mass of the first core polymer to the mass of the first shell polymer in the first polymer particle, preferably the mass of the first core polymer≤the mass of the first shell polymer, and more preferably the mass of the first core polymer<the mass of the first shell polymer. Still more preferably, the mass of the first core polymer is 40% to 80% when the mass of the first shell polymer is 100%. For this reason, the balance between the mass of the first core polymer and the mass of the first shell polymer becomes good, so that the fixability of the ink composition is good, the ejection stability of the ink composition is excellent, and vertical misalignment tends to hardly occur. The vertical misalignment refers to a phenomenon that, in the continuous ejection of ink, ink is partially solidified around a nozzle by long-term ejection, and thus clear vertical lines cannot be printed due to curved ejection direction.

Second Polymer Particle

The ink composition of the present embodiment includes a second polymer particle having a core-shell structure having a second core polymer and a second shell polymer in addition to the first polymer particle. Here, the second shell polymer has a glass transition temperature of 40° C. or higher. In the definition of the core-shell structure, the core-shell structure is the same as that described in the first polymer particle. Hereinafter, for the second polymer particle, the points different from the first polymer particle will be mainly described. Unless otherwise described, description of the first polymer particle can be similarly applied to the second polymer particle.

Second Core Polymer

The glass transition temperature of the second core polymer is not particularly limited, but, for example, is lower than 50° C., and preferably 0° C. to lower than 50° C. However, as described above, it is preferable that the glass transition temperature of the second core polymer is lower than that of the first core polymer.

The second core polymer is designed to be a highly hydrophobic polymer. Therefore, it is preferable that the second core polymer does not have an acid value. In addition, it is preferable that the second core polymer contains at least an aromatic monomer as a constitutional unit. Therefore, the second core polymer becomes hydrophobic, and thus a hydrophobic film can be formed. As a result, it is possible to improve water friction resistance that is one of the friction resistances of a recorded image.

In addition, the aromatic monomers, as a constitutional unit of the second core polymer, are the same as those described in the first core polymer. These aromatic monomers may be used alone or in a combination of two or more thereof.

Second Shell Polymer

The glass transition temperature of the second shell polymer is not limited as long as it is lower than the glass transition temperature of the first shell polymer, and the glass transition temperature thereof is 40° C. or higher, and preferably 40° C. to 150° C. due to the same reason as that of the first shell polymer.

Since the second shell polymer is hydrophilic, it has an acid value. Preferably, the acid value of the second shell polymer is 20 mgKOH/g to 120 mgKOH/g. When the acid value thereof is within the above range, sufficient hydrophilicity necessary for the second shell polymer can be secured.

The second shell polymer may contain an aromatic monomer as a constitutional unit. In this case, the content of an aromatic monomer as a constitutional unit in the second shell polymer is lower than the content of an aromatic monomer as a constitutional unit in the first shell polymer. When the second shell polymer contains an aromatic monomer as a constitutional unit, a detailed action mechanism is unknown, but the ejection bending is prevented. In particular, in the case of small dots, ink droplets easily bend, and thus ejection bending is suppressed according to an aspect of the invention. Therefore, the ink composition according to an aspect of the invention is suitable for a head that can eject ink dots in a multi-size from one nozzle. In addition, the second shell polymer contains a relatively stiff aromatic monomer, thereby improving the water friction resistance (wet friction) of a coated film formed on the recording medium. Further, when the content of an aromatic monomer as a constitutional unit in the second shell polymer is lower than the content of an aromatic monomer as a constitutional unit in the first shell polymer, it is possible to increase the glass transition temperature of the second shell polymer, and thus the second shell polymer becomes stronger than the first shell polymer in friction resistance or water friction resistance.

In addition, it is preferable that the second shell polymer contains a (meth)acrylate monomer and a carboxylic acid monomer as a constitutional unit. When such a polymer is used, it is possible to provide a carboxyl group on the surface of the second shell polymer. Therefore, the dispersion stability of the polymer particles is improved, and the viscosity of the ink composition becomes relatively low, and thus ejection stability tends to be further improved. The (meth)acrylate monomer is not particularly limited, but examples thereof include a hydrophilic (meth)acrylate monomer, a hydrophobic (meth)acrylate monomer having an alkyl group of 3 or more carbon atoms, and a hydrophobic (meth)acrylate monomer having a cyclic structure. Specific examples of the (meth)acrylate monomer and the carboxylic acid monomer are the same as those of the above-mentioned monomers constituting the polymer contained in the core polymer. These monomers may be used alone or in a combination of two or more thereof.

Entire Second Polymer Particles

The average particle diameter of the second polymer particles is preferably more 10 nm to 100 nm. As such, when the average particle diameter of the second polymer particles is relatively small, the gloss of the recorded image easily appears, and excellent film forming properties are exhibited. In addition, when the average particle diameter of the second polymer particles is relatively small, a large lump is hardly formed even when the second polymer particles are aggregated, and thus it is possible to suppress the clogging of nozzles. Further, when the average particle diameter of the second polymer particles is small, the viscosity of the ink composition can be increased relatively high, and thus it is possible to prevent the viscosity of the ink composition from being lowered to such a degree that ink ejection properties becomes unstable, even when the temperature of the ink composition rises in the recording head.

It is preferable that the content ratio of the first polymer particle and the second polymer particle is 1:1 to 3:1. When the content of the first polymer particle containing a larger amount of an aromatic monomer as a constitutional unit is greater than that of the second polymer particle, it is possible to make the balance of ejection stability, adhesiveness, and clogging properties better.

The content (solid basis) of polymer particles including the first and second polymer particles in the ink composition is preferably 0.5 mass % to 20 mass %, more preferably 0.6 mass % to 15 mass %, and still more preferably 0.7 mass % to 10 mass %, based on the total mass (100 mass %) of the ink composition. When the content of polymer particles is within the above range, it is possible to improve ejection stability, adhesiveness, and clogging properties. Here, when there is no need to distinguish the first polymer particles and second polymer particles, they are simply referred to as polymer particles.

Method of Forming First and Second Polymer Particles

There is no limitation to the formation method of the above-mentioned polymer particles, but preferably, the polymer particles are formed by soap-free polymerization without substantially using an emulsifier. The soap-free polymerization refers to a polymerization method for forming a core-shell polymer without substantially using an emulsifier. Here, the "emulsifier" means a surfactant used in synthesis. Further, an example of the soap-free polymerization includes a process of polymerizing polymer particles under the condition of the content of an emulsifier in a solution being 1 mass % or less. In the related art, the ink composition containing the polymer particles synthesized using such an emulsifier is problematic in that foaming easily occurs, it is difficult for the gloss of an image to appear, and foreign matter is easily generated. According to an aspect of the invention, an ink composition that suppresses the occurrence of such problems can be obtained. In the soap-free polymerization, for example, a shell polymer containing (meth)acrylic acid as a constitutional unit is formed, and a core is formed in the shell polymer. Moreover, when polymer particles are formed using soap-free polymerization, the average particle diameter of the polymer particles becomes very small, and the ejection stability and glossiness of an ink composition are improved.

The surfactant used in synthesis is not particularly limited, but an anionic surfactant and a nonionic surfactant are preferable. Examples of the anionic surfactant include sodium dodecylbenzene sulfonate, sodium laurate, and ammonium salts of polyoxyethylene alkyl ether sulfate. Examples of the nonionic surfactant include polyoxyethylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides. The core-shell polymer used in the present embodiment is prepared without using these surfactants.

The polymerization initiator used in the soap-free polymerization is not particularly limited, but is preferably a hydrophilic polymerization initiator. Examples thereof include potassium persulfate, ammonium persulfate, hydrogen peroxide, and the like.

An example of the soap-free polymerization method will be described, but a synthesis method is not limited to the following method. For example, ion exchange water and a polymerization initiator are put into a polymerization reactor provided with a jacket, and the pressure in the polymerization reactor is reduced to remove oxygen, and then the pressure therein is set to atmospheric pressure with nitrogen to make a nitrogen atmosphere. First, in the nitrogen atmosphere, the temperature in the polymerization reactor is set to a predetermined temperature, and then a pre-emulsion solution containing monomers (to become a constituent of a shell polymer) is dropped by a predetermined amount to perform a polymerization reaction to thus synthesize a shell polymer. Next, a core polymer is obtained by polymerizing the monomers using the void of the obtained shell polymer as a polymerization field, thereby synthesizing the polymer particles according to the present embodiment. Specifically, a monomer mixture containing the above-mentioned hydrophobic monomers is dropped into an aqueous dispersion medium containing a shell polymer to obtain a core polymer by polymerization, and the obtained core polymer is formed into polymer particles. As such, when a shell polymer is used as the polymerization field of a core polymer, there is no need to use an emulsifier in the monomer mixture.

According to such a soap-free polymerization, the content of an emulsifier in the ink composition can be easily set to 0.01 mass % or less, and the average particle diameter of the polymer particles can also be adjusted to be very small.

Organic Solvent

The ink composition of the present embodiment may include various organic solvents. Preferably, the ink composition of the present embodiment includes an alkyl polyol having a normal boiling point of 150° C. to 250° C. and a Hansen method-based solubility parameter (SP) value of 10 $(cal/cm^3)^{1/2}$ to 15 $(cal/cm^3)^{1/2}$. The organic solvent having a normal boiling point of 150° C. to 250° C. is evaporated by heating on an ink-non-absorptive or ink-low-absorptive recording medium, thereby fixing ink onto the recording medium.

The alkyl polyol satisfying the above-mentioned requirements is not particularly limited, but examples thereof include propylene glycol, 1,3-propanediol, 1,2-butanediol, 1,3-butanediol, 1,4-butanediol, 1,2-pentanediol, 1,5-pentanediol, 1,2-hexanediol, and 1,6-hexanediol. Among these, alkyl polyols of 5 or less carbon atoms, for example, 1,2-butanediol and 1,3-butanediol, are particularly preferable. The alkyl polyol of 5 or less carbon atoms is strongly hydrophobic. Therefore, the alkyl polyol can exist stably even in a state in which water is evaporated by the warming of the ejection head to make the concentration of the organic solvent higher, and thus it is possible to suppress short-term clogging and improve intermittent ejection properties.

The content rate of the alkyl polyol having an SP value of 10 $(cal/cm^3)^{1/2}$ to 15 $(cal/cm^3)^{1/2}$ is preferably 1 mass % to 30 mass %, and more preferably 2 mass % to 20 mass %. When the SP value of the alkyl polyol is within the range of $(cal/cm^3)^{1/2}$ to 15 $(cal/cm^3)^{1/2}$, the compatibility with the polymer particles having a hydrophilic functional group on the outside is good, thereby improving the dispersion of the polymer particles. In particular, the compatibility with the polymer particles provided with a carboxyl group is good. Therefore, it is possible to improve the intermittent ejection performance and prevent the missing of dots.

Here, a solubility parameter (SP value) is described. In the present specification, the SP value refers to an SP value based on the Hansen method. In the Hansen method, the SP value is calculated by classifying SP values $\delta$ into three terms $\delta_d$, $\delta_p$, and $\delta_h$ and representing the terms by the Equation $\delta^2 = \delta_d^2 + \delta_p^2 + \delta_h^2$. $\delta_d$, $\delta_p$, and $\delta_h$ are solubility parameters corresponding to a dispersion force term, a dipole-dipole force term, and a hydrogen bonding force term, respectively. The SP values of respective solvents based on the Hansen method are described below in Table 1.

TABLE 1

| | Hansen SP value $(cal/cm^3)^{1/2}$ |
|---|---|
| Water | 23.9 |
| Triethylamine | 18.33 |
| Glycerin | 18.08 |
| Trimethyl phosphate | 16.74 |

TABLE 1-continued

| | Hansen SP value (cal/cm$^3$)$^{1/2}$ |
|---|---|
| Ethylene glycol | 16.48 |
| Polyethylene glycol | 15.11 |
| Methanol | 14.84 |
| 1,3-butanediol | 14.47 |
| Diethylene glycol | 14.21 |
| 2-pyrrolidinone | 14.2 |
| Triethylene glycol | 13.77 |
| 1,2-butanediol | 13.46 |
| Dimethyl sulfoxide | 13.34 |
| Tripropanolamine | 13.21 |
| 1,6-hexanediol | 13.19 |
| 3-methyl-1,3-butanediol | 13.12 |
| Dipropylene glycol | 12.89 |
| Ethanol | 12.73 |
| Tetraethylene glycol | 12.56 |
| Nitromethane | 12.54 |
| 1,2-hexanediol | 12.48 |
| Dimethylformamide | 12.43 |
| 1-(2-hydroxyethyl)-2-pyrrolidone | 12.04 |
| 2-propanol | 11.79 |
| 2-ethyl-1,3-hexanediol | 11.59 |

The content of the above-mentioned alkyl polyol is not particularly limited, but is preferably 1.0 mass % to 35 mass %, and more preferably 2.0 mass % to 15.0 mass %, based on the total mass of the ink composition.

Cyclic Nitrogen Compound and Aprotic Polar Solvent

The ink composition of the present embodiment may further include at least one of a cyclic nitrogen compound and an aprotic polar solvent. When the ink composition includes a cyclic nitrogen compound or an aprotic polar solvent, it is possible to shift the apparent glass transition temperature of the polymer particles to a low-temperature region, and it is possible to soften the core polymer and the shell polymer at a temperature lower than the original temperature, thereby improving the adhesiveness of the ink composition onto the recording medium. Thus, in particular, when the recording medium is made of polyvinyl chloride, it is possible to improve the adhesiveness of the ink composition onto the recording medium.

The aprotic polar solvent is not particularly limited, but examples thereof include a cyclic ketone compound, a chain ketone compound, and a chain nitrogen compound. Typical examples of the cyclic nitrogen compound and the aprotic polar solvent include a pyrrolidone-based solvent, an imidazolidinone-based solvent, a sulfoxide-based solvent, a lactone-based solvent, and an amide ether-based solvent. Among these, 2-pyrrolidone, N-alkyl-2-pyrrolidone, 1-alkyl-2-pyrrolidone, γ-butyrolactone, 1,3-dimethyl-2-imidazolidinone, dimethyl sulfoxide, imidazole, 1-methylimidazole, 2-methylimidazole, 1,2-dimethyl imidazole, and alkoxy propionamide are preferable.

The content of the cyclic nitrogen compound and the aprotic polar solvent is not particularly limited, but is preferably 0.1 mass % to 40.0 mass %, and more preferably 1.0 mass % to 30.0 mass %, based on the total amount of the ink composition. By the addition of the cyclic nitrogen compound and the aprotic polar solvent within the above range, particularly, when the recording medium is made of polyvinyl chloride, it is possible to secure anti-clogging or ejection stability in addition to the adhesiveness of the ink composition onto the recording medium. However, when the content thereof is too large, there is a case of poor drying occurring.

Other Solvents

The ink of the present embodiment may further include other solvents other than the above-mentioned solvents. The other solvents other than the above-mentioned solvents are not particularly limited, but specific examples thereof include alcohols and glycols, such as ethylene glycol, diethylene glycol, triethylene glycol, propylene glycol, dipropylene glycol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol. These other solvents may be used alone or in a combination of two or more thereof.

The boiling point of each of the other solvents is preferably 140° C. to 280° C., more preferably 160° C. to 260° C., and still more preferably 180° C. to 240° C. When the boiling point of each of the other solvents is within the above range, intermittent characteristics tend to be improved.

The content of each of the other solvents is preferably 1.0 mass % to 25 mass %, and more preferably 5.0 mass % to 20 mass %, based on the total amount of the ink composition.

Alkyl Polyol Having a Normal Boiling Point of 280° C. or Higher

It is preferable that the ink composition of the present embodiment does not substantially contain an alkyl polyol having a normal boiling point of 280° C. or higher. When the ink composition does not substantially contain an alkyl polyol having a normal boiling point of 280° C. or higher, the quick-drying of the ink composition on the recording medium is further improved. Meanwhile, the storage stability of ink in an ejection head can be sufficiently secured by using the polymer particles having a core-shell structure according to the present embodiment. The alkyl polyol having a normal boiling point of 280° C. or higher is not particularly limited, but an example thereof includes glycerin. The sentence "the ink composition does not substantially contain an alkyl polyol having a normal boiling point of 280° C. or higher" means that the content of the alkyl polyol having a normal boiling point of 280° C. or higher is preferably 0 mass % to 0.50 mass %, and more preferably 0 mass %, based on the total amount of the ink composition.

Surfactant

It is preferable that the ink composition used in the present embodiment contains a surfactant. The surfactant is not particularly limited, but examples thereof include an acetylene glycol-based surfactant, a fluorine-based surfactant, and a silicone-based surfactant. When the ink composition contains these surfactants, the dryness of the ink composition adhered to the recording medium becomes better, and high-speed printing can be conducted.

Among these, a silicone-based surfactant is more preferable because the solubility thereof in the ink composition increases and thus the generation of foreign matter is further difficult to occur.

The acetylene glycol-based surfactant is not particularly limited, but, for example, is preferably one or more selected from alkylene oxide adducts of 2,4,7,9-tetramethyl-5-decyn-4,7-diol and 2,4,7,9-tetramethyl-5-decyn-4,7-diol; and alkylene oxide adducts of 2,4-dimethyl-5-decyne-4-ol and 2,4-dimethyl-5-decyne-4-ol. Commercially available products of the acetylene glycol-based surfactant are not particularly limited, but examples thereof include E series such as Olfine 104 series and Olfine E1010 (all are trade names, manufactured by Air Products Japan, Inc.), and Surfynol 465, Surfynol 61, and Surfynol DF110D (all are trade names, manufactured by Nissin Chemical Industry Co., Ltd.). These acetylene glycol-based surfactants may be used alone or in a combination of two or more thereof.

The fluorine-based surfactant is not particularly limited, but examples thereof include perfluoroalkyl sulfonates, perfluoroalkyl carboxylates, perfluoroalkyl phosphate esters, perfluoroalkyl ethylene oxide adducts, perfluoroalkyl betaine, and perfluoroalkyl amine oxide compounds. Commercially available products of the fluorine-based surfactant are not particularly limited, but examples thereof include S-144 and S-145 (manufactured by Asahi Glass Co., Ltd.); FC-170C, FC-430, and Florad-FC4430 (manufactured by Sumitomo 3M Co., Ltd.); FSO, FSO-100, FSN, FSN-100, and FS-300 (manufactured by Dupont, Inc.); and FT-250 and FT-251 (manufactured by Neos Co., Ltd.). These fluorine-based surfactants may be used alone or in a combination of two or more thereof.

Examples of the silicone-based surfactant include polysiloxane compounds, polyether-modified organosiloxane, and the like. Commercially available products of the silicone-based surfactant are not particularly limited, but specific examples thereof include BYK-306, BYK-307, BYK-333, BYK-341, BYK-345, BYK-346, BYK-347, BYK-348, and BYK-349 (all are trade names, manufactured by BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all are trade names, manufactured by Shin-Etsu chemical Co., Ltd.).

The content of the surfactant is preferably 0.1 mass % to 7.0 mass %, and more preferably 0.5 mass % to 5.0 mass %, based on the total amount of the ink composition. When the content of the surfactant is within the above range, the wettability of the ink composition adhered to the recording medium tends to be further improved.

pH Adjuster

The ink of the present embodiment may contain a pH adjuster. Examples of the pH adjuster include inorganic alkaline compounds such as sodium hydroxide, potassium hydroxide, ammonia, diethanolamine, triethanolamine, triisopropanolamine, morpholine, potassium dihydrogen phosphate, disodium hydrogen phosphate, and sodium ethylenediamine tetraacetate.

The pH adjusters may be used alone or in a combination of two or more thereof. The content of the pH adjuster is not particularly limited, and may be appropriately determined as necessary.

Other Components

The ink of the present embodiment may be appropriately added with various additives, such as a dissolution aid, a viscosity modifier, an antioxidant, a preservative, a fungicide, a defoamer, a corrosion inhibitor, and the like, in addition to the above components.

It is preferable that the ink composition of the present embodiment is recorded on a heated recording medium. When the above-mentioned heated recording medium is used, it is possible to form an image having excellent friction resistance. In addition, in the case where the recording medium is heated, a head is warmed by radiant heat thereof. According to the ink composition of the present embodiment, even when the head is warmed, the clogging of nozzles can be suppressed, and the ejection stability of the ink composition can be improved. The heating temperature is preferably 35° C. or higher, more preferably 40° C. to 110° C., and still more preferably 45° C. to 120° C.

In order to heat the recording medium, for example, a platen heater or infrared radiation is used. In addition, it is preferable that the ink composition of the present embodiment is an ink composition used in an ink jet recording method from the viewpoint of more effectively and reliably exhibiting the actions and effects of the invention.

Preparation Method of Ink

The ink of the present embodiment can be obtained by mixing the above-mentioned components (materials) in any order and filtering the mixture if necessary to remove impurities. Here, it is preferable in terms of convenience of handling that pigment is previously prepared in a state of being uniformly dispersed in a solvent, and is then mixed with other components.

As the method of mixing the materials, methods of sequentially putting the components into a container equipped with a stirring device such as a mechanical stirrer or a magnetic stirrer and then stirring and mixing these materials are preferably used. As a filtration method, for example, centrifugal filtration, filtration using a filter, or the like can be conducted, if necessary.

Recording Medium

The recording medium is an absorptive, low-absorptive, or non-absorptive recording medium. As the recording medium, a recording medium previously heated before the adherence of the ink composition or a recording medium heated during the adherence of the ink composition is used. When recording is performed by adhering the ink composition of the present embodiment onto the heated recording medium, the shell polymer is softened at the time of adhering the ink composition onto the recording medium, and thus a film having excellent friction resistance can be formed. Since the recording medium may be heated, it may not be needed to heat a nozzle more than necessary in order to lower the viscosity of the ink composition. Therefore, it is possible to suppress the adherence of components such as resin in the ink composition onto the inner wall of a nozzle, and clogging recovery properties become excellent. The surface temperature of the recording medium at the time of heating is preferably 30° C. to 60° C., and more preferably 40° C. to 60° C.

The absorptive recording medium is not particularly limited, but is particularly preferably a high-absorption recording medium such as a fabric. Examples of the fabric include, but are not limited to, natural fibers or synthetic fibers such as silk, cotton, wool, nylon, polyester, and rayon.

The low-absorptive recording medium is not particularly limited, but an example thereof includes coated paper in which a coating layer for receiving an oil-based ink composition is provided on the surface. The coated paper is not particularly limited, but examples thereof include printing papers such as art paper, coated paper, and matte paper.

The non-absorptive recording medium is not particularly limited, but examples thereof include a film or plate made of plastics such as polyvinyl chloride, polyethylene, polypropylene, and polyethylene terephthalate (PET); a plate made of metals such as iron, silver, copper, and aluminum; a metal plate or a plastic-made film fabricated by the deposition of these various metals; a plate made of an alloy of stainless steel or brass; and the like. In addition, it is preferable that the non-absorptive recording medium has neither an ink absorbing layer composed of silica particles or alumina particles nor an ink absorbing layer composed of a hydrophilic polymer such as polyvinyl alcohol (PVA) or polyvinyl pyrrolidone (PVP).

Here, each of the "low-absorptive recording medium" and "non-absorptive recording medium" may be a recording medium having an amount of water absorption of 10 mL/m² or less from the start of contact to 30 msec in Bristow's method. This Bristow's method is the most common method as a method of measuring the amount of liquid absorption in a short period of time and is also employed in Japan Technical Association of the Pulp and Paper Industry (JAPAN TAPPI). The details of the test method are described in Standard No. 51, "Paper and Paperboard—Liquid Absorption Test Method—Bristow's method" of "JAPAN TAPPI Paper Pulp Test Methods, 2000 version".

In addition, the non-absorptive recording medium or the low-absorptive recording medium can also be classified in accordance with wettability of water on a recording surface. For example, the recording medium can be characterized by dropping 0.5 μL of a water droplet onto the recording surface of the recording medium to measure the reduction rate of a contact angle (comparing a contact angle at 0.5 msec after impact to a contact angle at 5 sec after the impact). More specifically, as characteristics of the recording medium, the non-absorbency of the "non-absorptive recording medium" indicates that the above-described reduction rate is lower than 1% and the low-absorbency of the "low-absorptive recording medium" indicates that the reduction rate is higher than or equal to 1% and lower than 5%. In addition, the absorbency indicates that the above-described reduction rate is 5% or higher. It is possible to measure the contact angle using Portable Contact Angle Meter PCA-1 (manufactured by Kyowa Interface Science Co., Ltd.) or the like.

Recording Apparatus

The recording apparatus according to the present embodiment includes an ejection head for ejecting the ink composition onto a recording medium; a heating unit for heating the recording medium; and a drying unit for drying the ink composition for an ink jet adhered to the recording medium. This recording apparatus may further have the above-mentioned ink composition for an ink jet.

FIGURE is a schematic cross-sectional view of a recording apparatus according to the present embodiment. As shown in FIGURE, the recording apparatus 1 includes an ejection head 2, an IR heater 3, a platen heater 4, a curing heater 5, a cooling fan 6, a preheater 7, and a ventilation fan 8.

The ejection head 2 ejects the ink composition onto the recording medium. As the ejection head 2, an ejection head known in the related art can be used. As an example of the known ejection head in the related art, there is an ejection head for ejecting liquid droplets using the vibration of a piezoelectric element, that is, an ejection head for forming ink droplets by mechanical deformation of an electrostrictive element.

The recording medium heating unit serves to heat the recording medium at the time of ejecting the ink composition from the ejection head 2. The recording medium heating unit is not particularly limited, but examples thereof include a unit for directly heating the ejection head 2 by hot air or the IR heater 3 and a unit for heating the ejection head 2 through the recording medium heated by the platen heater 4.

In addition, when the IR heater 3 is used, the recording medium can be heated from the side of the ejection head 2. Therefore, the ejection head 2 is also heated simultaneously, but the temperature of the recording medium can be increased without being affected by the thickness of the recording medium, compared to when the recording medium is heated from the back side thereof by the platen heater 4 or the like. Further, when the platen heater 4 is used, the recording medium can be heated from the side opposite to the side of the ejection head 2. Thus, the ejection head 2 becomes relatively difficult to heat.

Preferably, at the time of ejecting the ink composition onto the recording medium, the recording apparatus 1 further includes a recording medium heating unit for heating a recording medium such that the surface temperature of the recording medium is 35° C. or higher. More preferably, the surface temperature thereof is 30° C. to 70° C. The recording medium heating unit is not particularly limited, but examples thereof include the IR heater 3 and a platen heater 4. When the recording apparatus 1 includes the recording medium heating unit, the ink composition adhered to the recording medium can be rapidly dried, and bleeding can be further suppressed. In addition, it is preferable that the surface temperature of the recording medium is lower than the glass transition temperature of the first shell polymer and the second shell polymer. Thus, it is possible to prevent the structure of the core-shell polymer from being disrupted before landing on the recording medium.

The drying unit serves to heat and dry the recording medium to which the ink composition for an ink jet is adhered. The drying unit is not particularly limited, but examples thereof include the curing heater 5, a hot air mechanism (not shown), a thermostatic bath (not shown), and the like. When the drying unit heats the recording medium on which an image is recorded, moisture or the like contained in the ink composition is more rapidly volatilized and scattered, and thus a film is formed by the polymer particles contained in the ink composition. In this way, the dried ink composition is strongly fixed (adhered) on the recording medium, and thus a high-quality image having excellent friction resistance can be obtained in a short time. The temperature of the drying unit is preferably higher than that of the recording medium heating unit, more preferably 70° C. or higher, and still more preferably 70° C. to 110° C. In addition, it is preferable that the temperature of the drying unit is higher than the glass transition temperature of the first shell polymer and the second shell polymer. Thus, the shell polymer is softened on the recording medium, so that adhesiveness and friction resistance are improved by the discharged core polymer and the softened shell polymer.

Here, the above described "heating the recording medium" refers to raising the temperature of the recording medium to a desired temperature, and is not limited to directly heating the recording medium.

The recording apparatus 1 may have the cooling fan 6. When the ink composition on the recording medium is cooled by the cooling fan 6 after the drying, a film having excellent adhesiveness can be formed on the recording medium.

In addition, the recording apparatus 1 may include the preheater 7 for previously heating (preheating) the recording medium before the ejection of the ink composition onto the recording medium. Further, the recording apparatus may include the ventilation fan 8 for more efficiently drying the ink composition adhered to the recording medium.

According to the recording apparatus of the present embodiment, it is possible to form a film with improved adhesiveness to the recording medium while preventing the clogging of nozzles.

Recording Method

The recording method according to the present embodiment is a method of recording an image on a recording medium using the recording apparatus shown in FIGURE. The recording method according to the present embodiment includes: a process of ejecting the ink composition onto the heated recording medium from nozzles; and a process (drying process) of further heating the recording medium on which the ink composition is adhered.

According to the recording method of the present embodiment, it is possible to form a film with improved adhesiveness to the recording medium while preventing the clogging of nozzles.

EXAMPLES

Hereinafter, Examples of the above-mentioned ink composition according to the invention will be described in detail, but the invention is not limited thereto.

Preparation of Aqueous Core-shell Polymer Particle Dispersion 100 parts of ion exchange water was put into a reactor equipped with a dropping device, a thermometer, a water-cooling reflux condenser, and a stirrer, and 0.2 parts of ammonium persulfate as a polymerization initiator was added under a nitrogen atmosphere of 70° C. with stirring, and then a monomer solution containing 29 parts of methyl methacrylate (MMA) and 6 parts of acrylic acid (AA), 7 parts of lauryl methacrylate (LMA), and 28 parts of styrene (St) was dropped into the reactor and subjected to a reaction to prepare a shell polymer by a polymerization reaction. Thereafter, a mixed solution of 0.2 parts of potassium persulfate, 22 parts of styrene (St), and 8 parts of n-butyl acrylate (BA) was dropped and polymerized under stirring at 70° C., and then the resultant product was neutralized with sodium hydroxide to adjust pH to 8 to 8.5, and filtered by a filter of 0.3 μm to obtain a first polymer particle (core-shell polymer A) dispersion.

As shown in Table 2 below, another first polymer particle (core-shell polymer B) was prepared in the same manner as that of core-shell polymer A, other than changing the ratio of components constituting the shell and the core. Further, two kinds of second polymer particles (core-shell polymers C and D) were prepared.

Here, the glass transition temperature of the core polymer and the shell polymer contained in the core-shell polymer was calculated using the above-described FOX Equation.

In addition, the obtained core-shell polymer particles were measured by Microtrac UPA (manufactured by Nikkiso Co., Ltd.) to obtain the particle diameters φ (nm) of the core-shell polymer particles.

In Table 2 shown below, in each of the polymer particles, Tg of the core polymer, Tg of the shell polymer, and average particle diameter of polymer particles are summarized.

TABLE 2

|  | First polymer particle | | Second polymer particle | |
| --- | --- | --- | --- | --- |
| Kind of core-shell resin | A | B | C | D |
| Tg of core portion | 40 | 32 | −10 | −10 |
| Tg of shell portion | 75 | 91 | 41 | 56 |

TABLE 2-continued

|  |  | First polymer particle | | Second polymer particle | |
| --- | --- | --- | --- | --- | --- |
| Kind of core-shell resin |  | A | B | C | D |
| Components of core portion | BA | 8 | 15 | 18 | 18 |
|  | St | 22 | 31 | 12 | 12 |
| Components of shell portion | MMA | 29 | 23 | 46 | 46 |
|  | AA | 6 | 4 | 7 |  |
|  | LMA | 7 |  | 18 |  |
|  | St | 28 | 22 |  |  |
|  | MA |  | 5 |  | 14 |
|  | MAA |  |  |  | 11 |
| Average particle diameter (nm) |  | 32 | 30 | 35 | 28 |
| Aromatic monomer (%) |  | 50 | 53 | 12 | 12 |

Here, the meanings of the abbreviations in Table 2 are as follows.

BA: n-butyl acrylate

St: styrene

MMA: methyl methacrylate

AA: acrylic acid

LMA: lauryl methacrylate

MA: methacrylic acid

MAA: methyl acrylate

The polymer of Comparative Example is a non-core-shell polymer (Tg: 80° C.) prepared by polymerizing 80 parts of methyl methacrylate (MMA), 10 parts of lauryl methacrylate (LMA), and 10 parts of methacrylic acid (MA).

Preparation of Ink Composition

Materials were respectively mixed in the composition ratios (mass %) in Table 3 shown below, and sufficiently stirred to obtain cyan (C), magenta (M), yellow (Y), and black (Bk) ink sets (Examples 1 to 5 and Comparative Examples 1 and 2). The resin components of each of the inks included in the inks sets of Examples 1 to 5 and Comparative Examples 1 and 2 are summarized in Table 4 below.

TABLE 3

| Ink composition |  | C | M | Y | BK |
| --- | --- | --- | --- | --- | --- |
| Color material (pigment solid content) | C.I PB15:3 | 2 |  |  |  |
|  | C.I PR122 |  | 3 |  |  |
|  | C.I PY155 |  |  | 4 |  |
|  | Carbon black |  |  |  | 3.5 |
| Solvent | 1,2-hexanediol | 6 | 6 | 6 | 6 |
|  | Propylene glycol | 10 | 10 | 10 | 10 |
|  | 2-pyrrolidone | 10 | 10 | 10 | 10 |
| Resin component |  | 4 | 4 | 4 | 4 |
| surfactant | BYK348 | 1 | 1 | 1 | 1 |
| solvent | water | 69 | 69 | 69 | 65.5 |

TABLE 4

|  |  | Ex. 1 | Ex. 2 | Ex. 3 | Ex. 4 | Ex. 5 | Comp. Ex. 1 | Comp. Ex. 2 |
| --- | --- | --- | --- | --- | --- | --- | --- | --- |
| Content of resin component in ink | Core-shell resin A | 2 | 2 |  | 2 |  |  |  |
|  | Core-shell resin B |  |  | 2 |  | 3 |  |  |

TABLE 4-continued

|  |  | Ex. 1 | Ex. 2 | Ex. 3 | Ex. 4 | Ex. 5 | Comp. Ex. 1 | Comp. Ex. 2 |
|---|---|---|---|---|---|---|---|---|
| (mass %) | Core-shell resin C | 2 | 2 |  | 2 | 1 |  | 4 |
|  | Core-shell resin D |  |  | 2 |  |  |  |  |
|  | Non-core-shell resin |  |  |  |  |  | 4 |  |
| Temperature in head during printing (° C.) |  | 35 | 55 | 55 | 55 | 55 | 55 | 35 |
| Surface temperature of medium (PVC) during printing (° C.) |  | 40 | 45 | 45 | 30 | 45 | 45 | 40 |
| Evaluation item | Ejection stability | A | B | A | A | A | A | C |
|  | adhesiveness | A | A | A | B | B | A | A |
|  | Clogging properties | A | A | A | A | B | C | A |

Evaluation Method (1) Ejection Stability

A part of the printer PX-G930 (manufactured by Seiko Epson Corporation) was modified to obtain a printer which can adjust the heating of a recording medium at the time of ink jet recording. The ink cartridge of this printer was filled with the obtained ink set. The ejection stability of the ink set during intermittent printing was evaluated using this printer under the condition that the surface temperature of the recording medium is 40° C. or higher and the temperature in the head is 35° C. or 55° C. First, it was confirmed that the ink was successfully ejected from all nozzles. The rest time of 1 minute is provided, followed by measuring the ejection stability at the time of ejecting the ink. Evaluation criteria are as follows. The results thereof are summarized in Table 4.

Evaluation Criteria

A: when ink is ejected at an ink temperature in a head of 55° C. after 1 minute from the printing stop, non-ejection or ejection disturbance does not occur, and thus there is no problem B: when ink is ejected at an ink temperature in a head of 55° C. after 1 minute from the printing stop, non-ejection or ejection disturbance somewhat occurs, but ink returns during ejection, and thus there is no problem C: when ink is ejected at an ink temperature in a head of 55° C. after 1 minute from the printing stop, non-ejection or ejection disturbance somewhat occurs, and ink does not returns during ejection, and thus maintenance is needed (2) Adhesiveness The above-described ink jet printer (trade name: PX-G930, manufactured by Seiko Epson Corporation) was filled with the ink composition, and this ink composition was recorded on a recording medium (PVC coated paper). In this case, the surface temperature of the recording medium was set to 30° C. or 45° C. After printing, the recorded ink composition was dried at 100° C. by a drying heater. The printing surface was evaluated using the JIS cross-cut test as follows. The evaluation results thereof are summarized in Table 4.

Evaluation Criteria

A: peeling does not occur at all

B: peeling is seen at 3 or fewer of 25 grids (3) Clogging Properties

The ink jet printer (trade name: PX-G930, manufactured by Seiko Epson Corporation) was filled with the ink composition, and then it was confirmed by printing a nozzle check pattern that there is no defective filling or nozzle clogging. Thereafter, this printer was left for 1 week under an environment of a temperature of 25° C. and a relative humidity of 40% to 60% in a state in which the cap of the printer head was removed (in a state in which head nozzle surface is likely to be dried). Then, a cleaning operation was performed, and then a nozzle check pattern was printed to observe the ejected state of the nozzles, thereby evaluating the clogging properties of ink in the head. Here, evaluation criteria are as follows. The results thereof are summarized in Table 4.

Evaluation Criteria

A: ink was successfully ejected from all the nozzles within the cleaning operation 3 times B: ink was successfully ejected from all the nozzles in the cleaning operation 4 to 8 times C: ink was not successfully ejected from some nozzles even in the cleaning operation 9 or more times As shown in Table 3, it was found that the ink compositions of Examples 1 to 5 are good in the balance of ejection stability, adhesiveness, and clogging properties, compared to the ink compositions of Comparative Examples 1 and 2. Specifically, in Example 1, since the ejection temperature is low, no problem occurs. In Example 2, since the ejection temperature is raised, ejection became somewhat unstable, but good results were obtained for the adhesiveness and clogging properties. In Example 3, since Tg of the polymer used is high, good results were also obtained for ejection stability even when ejection temperature is raised. In Example 4, since the temperature of the medium is lowered during printing, adhesiveness was somewhat reduced. In Example 5, since the core-shell polymer B used contains a large amount of hydrophobic components, clogging properties were somewhat reduced. In Comparative Example 1, since the core-shell polymer is not used, clogging properties were very poor. In Comparative Example 2, since only the core-shell polymer having low Tg is used, short-tem clogging properties were reduced, and evaluation of ejection stability became poor.

The entire disclosure of Japanese Patent Application No. 2014-056094, filed Mar. 19, 2014 is expressly incorporated by reference herein.

What is claimed is:

1. An ink composition, which is recorded on a heated recording medium, comprising:
a color material;
water;
a first polymer particle; and
a second polymer particle,
wherein the first polymer particle has a core-shell structure including a first core polymer and a first shell polymer, the second polymer particle has a core-shell structure including a second core polymer and a second shell polymer, each of the first shell polymer and the second shell polymer has a glass transition temperature of 40° C. or higher, and the glass transition temperature of the first shell polymer is higher than that of the second shell polymer.

2. The ink composition according to claim 1, wherein, when the first shell polymer contains an aromatic monomer as constitutional unit and the second shell polymer contains an aromatic monomer as a constitutional unit, the content of the aromatic monomer as a constitutional unit in the second shell polymer is lower than the content of the aromatic monomer as a constitutional unit in the first shell polymer.

3. The ink composition according to claim 1, wherein each of the first and second polymer particles is synthesized without substantially using an emulsifier.

4. The ink composition according to claim 1, wherein the first polymer particle contains an aromatic monomer as a constitutional unit in an amount of 10 mass % to 70 mass %.

5. The ink composition according to claim 1, wherein the glass transition temperature of the first core polymer is higher than that of the second core polymer.

6. The ink composition according to claim 1, wherein the content ratio of the first polymer particle and the second polymer particle is 1:1 to 3:1.

7. The ink composition according to claim 1, wherein each of the first and second polymer particles has an average particle diameter of 10 nm to 100 nm.

8. The ink composition according to claim 1, further comprising a cyclic nitrogen compound and/or an aprotic polar solvent.

* * * * *